Aug. 27, 1929.  H. A. HOESCHEN  1,726,068
THERMOSTATIC FLOW REGULATOR
Filed Aug. 12, 1927   2 Sheets-Sheet 1
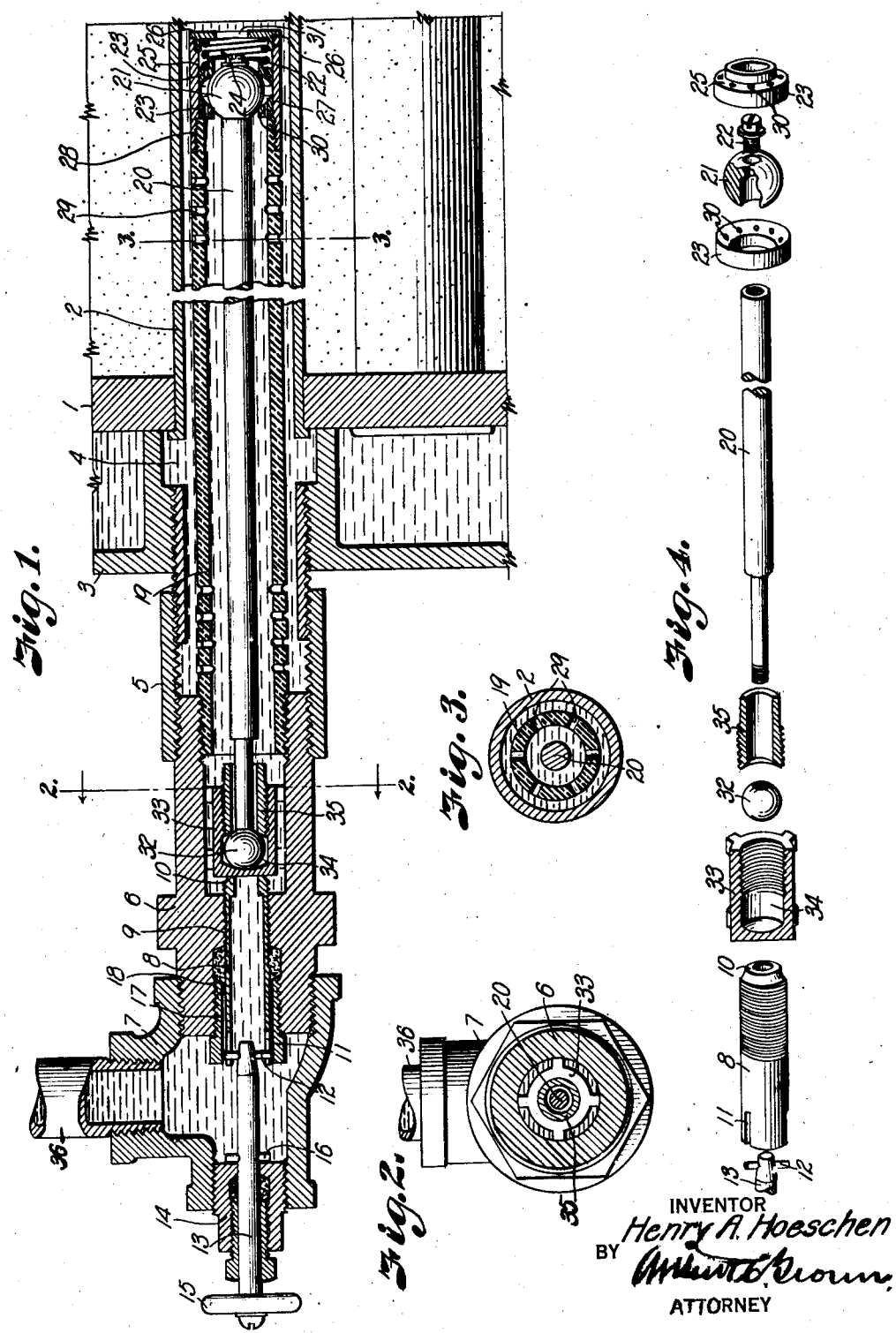
INVENTOR
Henry A. Hoeschen
BY
ATTORNEY

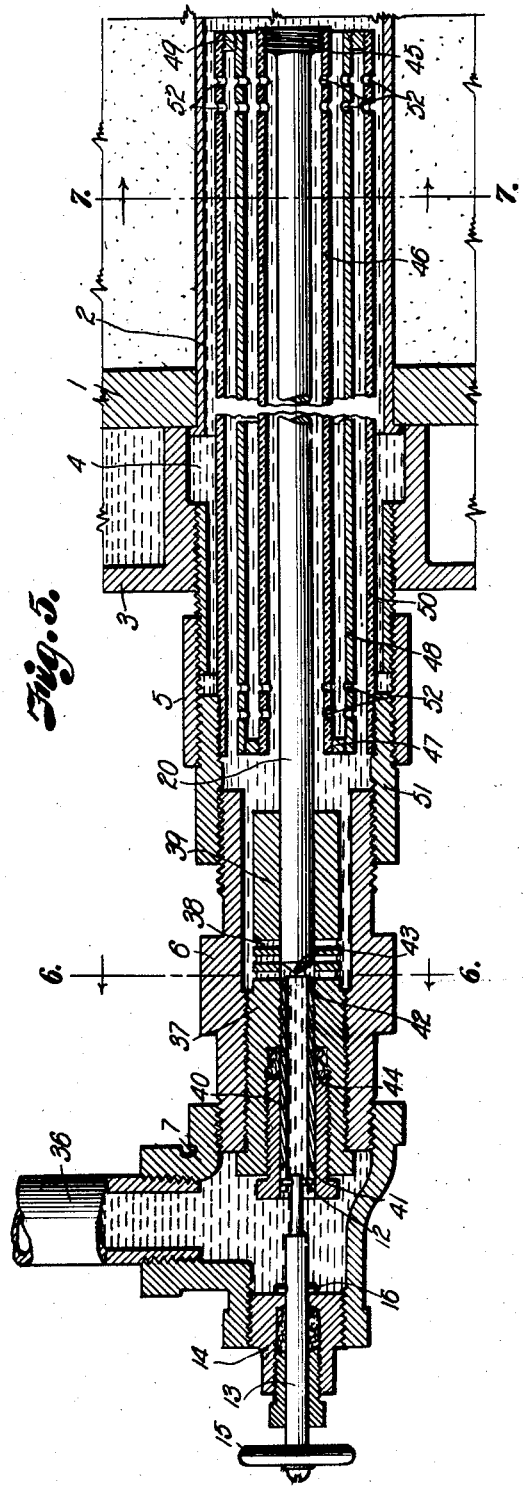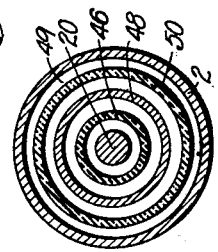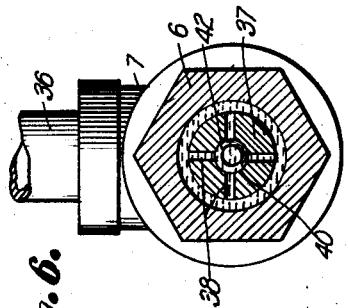

Patented Aug. 27, 1929.

1,726,068

UNITED STATES PATENT OFFICE.

HENRY A. HOESCHEN, OF OMAHA, NEBRASKA, ASSIGNOR OF ONE-HALF TO BAKER ICE MACHINE CO., INC., OF OMAHA, NEBRASKA, A CORPORATION OF NEBRASKA.

THERMOSTATIC FLOW REGULATOR.

Application filed August 12, 1927. Serial No. 212,466.

My invention relates to thermostatic flow regulators and more particularly to a device of that character for use in connection with refrigerating apparatus to control and regulate flow of cooling medium through a coil, or of refrigerant in a condenser; the principal object of the invention being to control and regulate flow of the fluid medium in response to changes in temperature of the fluid to or from which heat is to be transferred.

For the purpose of illustration I have shown the invention applied to the condenser of an ammonia refrigerating system for controlling and regulating outlet of the water from a cooling coil, but without intention of limiting the invention to this particular use.

In the drawings:

Fig. 1 is a central longitudinal section of a flow regulator embodying my invention applied to the outlet end of the cooling coil of an ammonia condenser.

Fig. 2 is a transverse section on the line 2—2, Fig. 1.

Fig. 3 is a transverse section on the line 3—3, Fig. 1.

Fig. 4 is a detail perspective view of the valve and valve stem, showing the parts separated but in relative relation.

Fig. 5 is a longitudinal section of a modified form of the regulator.

Fig. 6 is a cross section on the line 6—6, Fig. 5.

Fig. 7 is a cross section on the line 7—7, Fig. 5.

Referring more in detail to the drawings:

1 designates the head of an ammonia condenser of ordinary type containing a cooling coil 2, and 3 a water cap for directing flow of cooling water back and forth through the tubes in accordance with common practice. The tube 2 is shown as communicating at its outlet end with a chamber 4 having communication through a coupling 5 with a valve housing 6 which is attached to the water cap by means of the coupling.

Attached to the outer end of the housing 6 is a T fitting 7, and communicating with the fitting is a valve barrel 8 having threaded mounting in the housing at 9, the inner end of the barrel terminating in a valve seat 10 within the housing, the outer end of the barrel being provided with transverse slots 11 for receiving the cross pin 12 on a stem 13 which projects through a stuffing box 14 on the fitting and is provided with a hand wheel 15.

The stem 13 carries a stop member 16 which may consist of a cross pin adapted for engagement with the inner end of the stuffing box 14 to limit outward movement of the stem. The cross pin 12 fits snugly within the gland 17 of a stuffing box 18 contained within the outer end of the housing 6 so that the pin may turn in guided relation with the bland, and the valve barrel may move longitudinally relative to the pin when the stem 13 is rotated in either direction, the pin turning the valve barrel on its threaded connection to adjust the barrel longitudinally.

Anchored to the housing 6 at one end is a tube 19 of a material having a high coefficient of expansion, preferably hard rubber, and which extends inwardly through the housing and coupling into that part of the outlet end of the cooling coil 2 contained within the condenser, so that it may be responsive to changes in temperature of water in the tube induced by variations in temperature of refrigerant (ammonia) contained within the condenser.

20 designates a valve stem connected with the inner end of the tube 19 by a swivel coupling preferably consisting of a ball 21 attached to the stem by a screw 22 and seated in a socket 23 comprising rings, one fitting against the end of the tube 19 and held thereto by a spring 24 which bears against the other ring and engages a shoulder 25 on the end of the collar and bears against a cap 26 threaded onto the end of a sleeve 27 which houses the collar 23, and is threaded onto the reduced end 28 of the tube 19. The spring 24 serves to hold the swivel coupling in restraint against the end of the tube 19, but its primary function is to compensate for any undue strains caused by excessive contraction of the tube 19 to an extent sufficient to bend the stem 20, which would otherwise occur in case the tube were contracted to a length less than that of the stem.

The tube 19 is provided with transverse apertures 29, the collar 23 with longitudinal apertures 30 and the cap 26 with an opening 31 for providing circulation of cooling water from the coil tube 2 into the regulator tube 19 during operation of the device.

At its outer end the stem 20 is reduced in diameter and provided with a swivel ball 32. Surrounding the ball 32 and a part of the reduced end of the stem is a cap 33 having a socket 34 within which the ball may turn and provided with a keeper sleeve 35 threaded into the rearwardly opening cup and adapted for retaining the cap on the ball. The outer end of the cap 33 is provided with a flat face adapted for contact with the valve seat 10 of the barrel 8, constituting the cap a valve for controlling and regulating flow of cooling water from the coil tube to the valve barrel and thence to the outlet fitting and its flow pipe 36. The stem 20 is of a material having a relatively low coefficient of expansion, such as iron, so that when the tube 19 expands in response to rise of temperature of the cooling water induced by inflow of hot ammonia gas, the stem 20, having the lower coefficient of expansion, will be drawn inwardly (to the right, Fig. 1) by the greater expansion of the tube 19 which, being fixed at its outer end, will expand outwardly and draw the stem with it, to unseat the valve 33 from the valve seat 10, and permit outlet of the cooling water and a flow through the coil to produce a cooling effect on the ammonia gas to carry off heat from the ammonia gas.

In Figs. 5 to 7 of the drawings I have illustrated a modification of the device wherein the housing 6 is provided with a guiding sleeve 37 having a central bore 39 communicating with the housing through lateral ports 38, and contained in the bore is a valve barrel 40 threaded into the sleeve 37 provided with the cross slots 41 at one end and with a seat 42 at the opposite end adapted for receiving a needle valve 43 on the stem 20, the sleeve 38 being equipped with a stuffing box 44 for preventing flow around the barrel.

The stem 20 of the modified form is connected at its inner end, through a spacing collar 45, with the inner end of a tube 46 which surrounds the stem. The tube 46 is connected at its outer end, through a spacing collar 47, with a tube 48, the tube 48 in turn being connected, through a spacing collar 49, with a tube 50, the inner end of which is anchored to a coupling member 51 attached to the water cap 3 and mounting the housing 6 as in the preferred form.

The tubes 46, 48 and 50 are provided at their ends with lateral ports 52 through which cooling water may circulate between the tubes and about the stem, subjecting the tubes and stem to variations in temperature of the water. In the modified form the stem 20 and tube 48 are of materials having low coefficient of expansion and the tubes 46 and 50 of materials having high coefficient of expansion. Consequently when temperature of the cooling water rises, the alternate tubes expand and the outer tube 50 being anchored at its outer end, there is a tendency of the tubes to push inwardly, drawing the stem 20 within them to unseat the valve, the alternate arrangement of the members having high and low coefficient of expansion providing an increment of longitudinal movement resulting in a total of expansion sufficient to provide the desired opening of the valve.

It is apparent that reduction in temperature of the cooling water will exert a contrary influence on the thermostatic element, tending to close the valve.

The modified form of expander is particularly adaptable for use in an assembly wherein the longitudinal area of heat transfer is limited or concentration of the thermostatic members is desirable.

While I have described the invention as applied to the outlet end of a cooling coil with the valve controlling outlet of the cooling water, it is apparent that the device is adaptable for controlling supply as well as outlet of the cooling water or that it may be used in connection with the expansion valve for controlling or regulating intake or outlet of the refrigerant, or in any other relation wherein flow of liquid is to be controlled thermostatically.

What I claim and desire to secure by Letters Patent is:

1. A device of the character described, including a perforated tube and a stem contained in said tube, the stem and tube having different coefficients of expansion, a socket slidable on the end of the tube, a ball on said stem, seated in the socket to provide swivel connection between the tube and the stem and a spring in the end of the tube engaging the socket to yieldingly retain the stem in set position and compensate for excessive contraction of the member having the higher coefficient of expansion.

2. A device of the character described including a perforated tube, a coupling sleeve on one end of the tube, a cap on said sleeve, a ball socket in said sleeve, a stem having a ball seated in said socket to provide swivel mounting of the stem on the tube, a spring interposed between the socket and cap to yieldingly restrain the stem, a valve on the opposite end of the stem, and a flow member controlled by said valve, the tube having means for anchorage at its end opposite the socket and the tube and stem having different coefficients of expansion.

3. A thermostatic flow regulator including in combination with a circulating fluid conduit, and a flow line for said conduit, a tube of material having a high coefficient of expansion anchored at one end and having a retaining cap at the other end, a bearing collar slidable in said cap, a stem in said tube having universal bearing connection with said collar, and a valve on said stem controlling the flow line.

4. A thermostatic flow regulator including in combination with a circulating fluid conduit, and a flow line for said conduit, a tube of material having a high coefficient of expansion anchored at one end and having a retaining cap at the other end, a split bearing collar slidable in said cap, a stem in said tube having a ball retained for universal bearing in said split collar, and a valve on said stem controlling the flow line.

5. A thermostatic flow regulator including in combination with a circulating fluid conduit, and a flow line for said conduit, a tube of material having a high coefficient of expansion anchored at one end and having a retaining cap at the other end, a split bearing collar slidable in said cap, a stem in said tube having a ball retained for universal bearing in said split collar, a valve on said stem controlling the flow line, and a spring in the cap for cushioning the collar.

6. A thermostatic flow regulator including in combination with a circulating fluid conduit, and a flow line for said conduit, a tube of material having a high coefficient of expansion anchored at one end and having a retaining cap at the other end, a bearing collar slidable in said cap, a stem in said tube having universal bearing connection with said collar, a valve on said stem controlling the flow line, the collar having apertures for permitting circulation of fluid through the bearing connection.

In testimony whereof I affix my signature.

HENRY A. HOESCHEN.